(12) United States Patent
Moon et al.

(10) Patent No.: US 8,820,844 B2
(45) Date of Patent: Sep. 2, 2014

(54) FRAME TYPE DUMP DECK FOR DUMP TRUCK

(71) Applicant: Hyundai Motor Company, Seoul (KR)

(72) Inventors: Ji Hoon Moon, Yongin-si (KR); Kang Woo Lee, Jeonju-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/900,200

(22) Filed: May 22, 2013

(65) Prior Publication Data

US 2014/0183904 A1 Jul. 3, 2014

(30) Foreign Application Priority Data

Dec. 28, 2012 (KR) ........................ 10-2012-0156148

(51) Int. Cl.
*B60P 1/16* (2006.01)
*B60P 1/28* (2006.01)

(52) U.S. Cl.
CPC ..................................... *B60P 1/286* (2013.01)
USPC ..................................... 298/22 R; 296/183.2

(58) Field of Classification Search
USPC ...... 298/7, 17 R, 22 R, 22 P, 17 B; 296/183.2
See application file for complete search history.

(56) References Cited

U.S. PATENT DOCUMENTS 5,033,794 A * 7/1991 Vick ........................... 298/22 R
7,357,457 B2 4/2008 Thomas

FOREIGN PATENT DOCUMENTS

| JP | 06-191341 | | 7/1994 |
| JP | 2007-331677 | A | 12/2007 |
| KR | 10-2007-0045079 | A | 5/2007 |

* cited by examiner

*Primary Examiner* — Stephen Gordon
(74) *Attorney, Agent, or Firm* — McDermott Will & Emery LLP

(57) ABSTRACT

A frame type dump deck for a dump truck includes a front panel having a pocket formed in a center portion of the front panel having side wall panels which extend perpendicularly from an interior face of the center portion. Two side panels attached to opposing ends of the interior face of the front panel extend in a deck length direction. A floor panel has floor frames arranged in two parallel rows which extend in the deck length direction and terminate at the front panel. Pocket frames extend from the terminal ends of the floor frames in parallel along each edge of the pocket, and include top portions connected via a pocket reinforcement member. The pocket frames are integrally formed on an outside face of the front panel so that an eye end cylinder may be connected to a cylinder hinge above the pocket.

5 Claims, 7 Drawing Sheets

FRAME TYPE DUMP DECK FOR DUMP TRUCK

CROSS-REFERENCE TO RELATED PATENT APPLICATION

This application claims the benefit of Korean Patent Application No. 10-2012-0156148, filed on Dec. 28, 2012 in the Korean Intellectual Property Office, the disclosure of which is incorporated herein in its entirety by reference.

BACKGROUND

1. Field

The present disclosure relates to a frame type dump deck for a dump truck, and more particularly, to a frame type dump deck for a dump truck in which an eye end cylinder is mounted on the frame type dump deck so that cost and weight of the frame type dump deck for the dump truck may be reduced.

2. Background

In general, large dump trucks transport a construction material, such as sand or gravel. A large dump truck consists of a combination of a deck on which a baggage is loaded, and a cylinder that lifts the deck. The deck is classified into a floor type deck and a frame type deck depending on the existence of a reinforcement material on a bottom surface of the deck. The cylinder in this case is determined according to each deck type.

The deck on which a construction material, such as sand or gravel, is loaded, is usually manufactured to have sufficient stiffness. In order to easily load and unload the construction material loaded on the deck, the deck is installed to rotate in a backward direction relative to the dump truck and to ascend.

A loading bay, such as a combination of a floor type deck 100 and an eye end cylinder 110 or a combination of a frame type deck 120 and an outer cover cylinder 130, as illustrated in FIG. 1, is mainly used.

Here, the top of the eye end cylinder 110 is connected to a cylinder hinge of the floor type deck 100, and the bottom of the eye end cylinder 110 is connected to a sub frame.

A lower-side bracket of the outer cover cylinder 130 is connected to a lower pocket face of the frame type deck 120, and the bottom of the outer cover cylinder 130 is connected to a sub frame.

The combination of the floor type deck 100 and the eye end cylinder 110 has a simple structure, is light-weight and is cheap. However, due to weak torsional stiffness, when the loading bay is lifted in an inclined place, the loading bay may be turned over and thus, reinforcement of the deck is required.

The combination of the frame type deck 120 and the outer cover cylinder 130 has large torsional stiffness and high adjustment stability, and any special reinforcement of the deck is not required. However, it has a complicated structure, is heavy and is expensive.

For these reasons, dump trucks made in Korea usually use the combination of the floor type deck and the eye end cylinder, and dump trucks made in countries other than Korea usually use the combination of the frame type deck and the outer cover cylinder.

For example, various types of loading bays are disclosed in U.S. Pat. No. 7,357,457, Korean Patent Laid-open Publication No. 2007-0045079, Japanese Patent Laid-open Publication No. 2007-331677, and Japanese Patent Laid-open Publication No. 06-191341.

FIGS. 2 and 3 are perspective views of a pocket top reinforcement structure of a loading bay including a combination of a floor type deck and an eye end cylinder according to the related art.

As illustrated in FIG. 2, a cylinder hinge 120 is mounted on the top of a pocket 110 disposed on a deck 100, and an outside reinforcement material 130 is deposited around the top of the pocket 110 to which the cylinder hinge 120 belongs.

In general, the top of the pocket 110 is a stiffness discontinuous part and has a high probability of damage. When the cylinder hinge 120 is mounted on the top of the pocket 110, a car torsion phenomenon occurs, and a large peripheral stress occurs during a deck lifting operation so that there is a high probability of damage of peripheral parts of the cylinder hinge 120.

As illustrated in FIG. 3, in order to prevent damage of a portion of the pocket 110 on which the cylinder hinge 120 is mounted, the portion is padded with 10 additional inside reinforcement materials 140-1 to 140-10.

A board that is used in the dump truck is made of ultra-high tensile steel having a yield strength of 1200 MPa or more, and most cracks occur in a welding portion (the yield strength of the welding portion is 500 MPa).

Thus, as the number of welding portions increases, the higher the probability of fatigue damage is.

That is, the durability of a reinforcement material for improving stiffness is lowered The number of reinforcement patches is large, and the size of a reinforcement member is small, and welding of the reinforcement member is difficult. Thus, there is a disadvantage in production.

FIG. 4 is a perspective view and a cross-sectional view of a pocket bottom reinforcement structure of a loading bay including a combination of a floor type deck and an eye end cylinder according to the related art.

As illustrated in FIG. 4, in the pocket bottom reinforcement structure, a reinforcement member 160 is attached to a circumference of a connection part between a pocket 110 and a floor 150.

In the reinforcement structure, a corner of the reinforcement member 160 serves as a lever hinge so that a stress concentration phenomenon occurs. Thus, bending deformation in which a connection part of a bottom of the reinforcement member 160 of the floor 150 is bent to a downward direction, occurs. As a result, when all loads are concentrated on the floor 150, bending deformation of the floor 150 occurs.

SUMMARY

The present disclosure provides a frame type dump deck for a dump truck in which the frame type dump deck having a new shape in which a cylinder hinge may be mounted on the top of the frame type dump deck, is implemented by combining an eye end cylinder with the frame type dump deck and by improving the structure of upper and lower portions of a pocket so that the frame type dump deck for the dump truck may be easily manufactured at low cost, its weight may be reduced and its structural stiffness may be guaranteed.

According to an aspect of the present disclosure, there is provided a frame type dump deck for a dump truck, including: a front panel having a pocket formed in a center portion between of right and left widths of the front panel, the pocket including side wall panels which extend perpendicularly from an interior face of the center portion of the front panel; two side panels, each side panel attached to opposing ends of the interior face of the front panel and which extend in a deck length direction; and a floor panel attached to the interior face of the front panel, the floor panel having floor frames arranged in two parallel rows which extend in the deck length direction, and terminate at the front panel, and pocket frames which extend from the terminal ends of the floor frames and which extend in parallel along each edge of the pocket and include top portions connected to each other by a pocket reinforcement member disposed in a direction perpendicular to the direction of the pocket frames. The pocket frames are integrally formed on an outside face of the front panel so that an eye end cylinder is connected to a cylinder hinge above the pocket.

An inside top of the pocket may extend to a height that is coincident with a top of the front panel, and the frame type dump deck may further include a pocket extension portion that is formed on a bottom of the pocket adjacent to the floor panel, extends to sides of the floor frames disposed on the floor panel and is welded to the floor frames.

An upper reinforcement member and a lower reinforcement member may be installed at an inside bottom of the pocket, may be disposed in parallel along both sidewall panels of the pocket, may be stacked in a direction parallel to the direction of the pocket frames and may connect the pocket and the floor panel to each other. The lower reinforcement member may extend to a position between the inside face of the front panel and a terminal end of the side wall panels opposite the inside face of the front panel in the deck length direction.

BRIEF DESCRIPTION OF THE DRAWINGS

The above and other features and advantages of the present disclosure will become more apparent by describing in detail exemplary embodiments thereof with reference to the attached drawings in which.

DETAILED DESCRIPTION

The present disclosure will now be described more fully with reference to the accompanying drawings, in which exemplary embodiments of the disclosure are shown.

Figure 1:
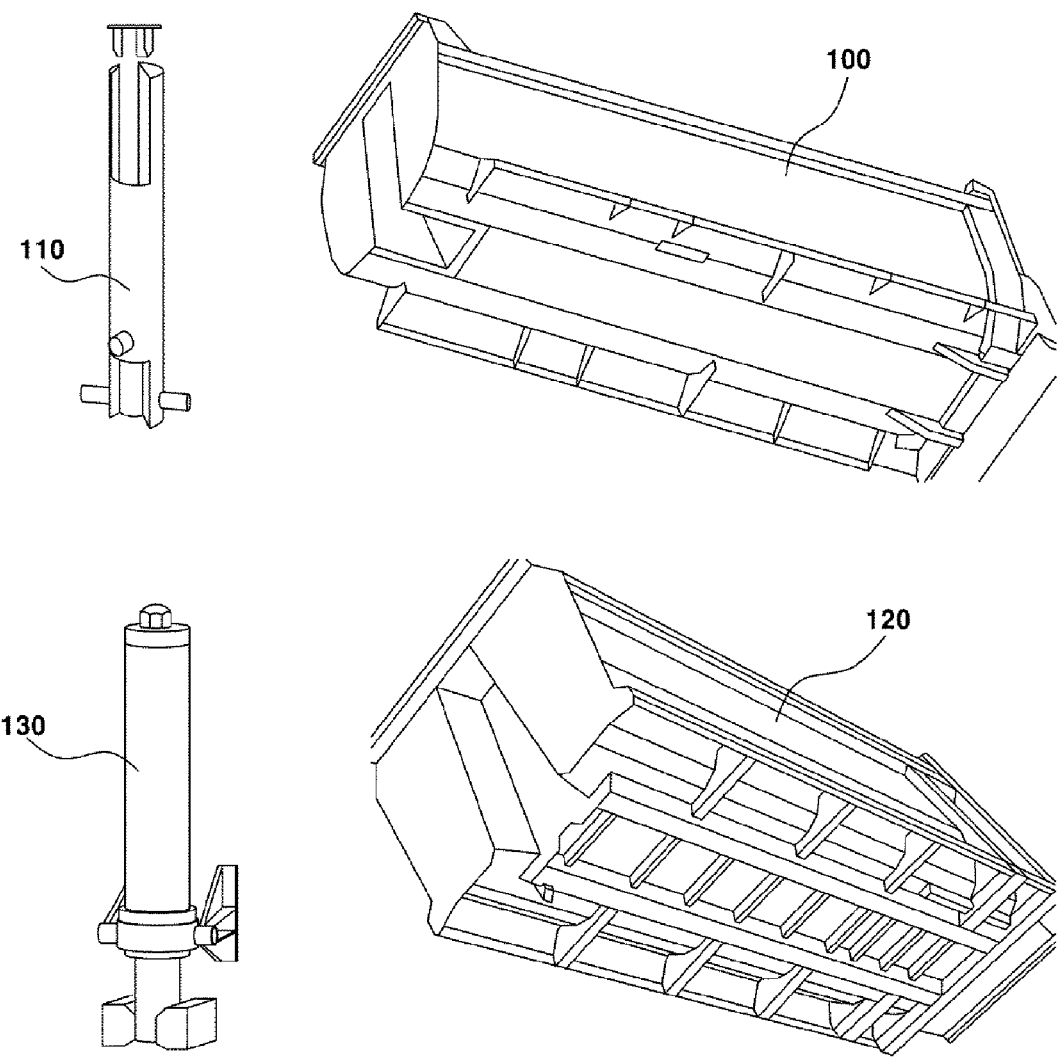
FIG. 1 is a perspective view of a loading bay including a combination of a floor type deck and an eye end cylinder and a loading bay including a combination of a frame type deck and an outer cover cylinder according to the related art.
Figure 2:
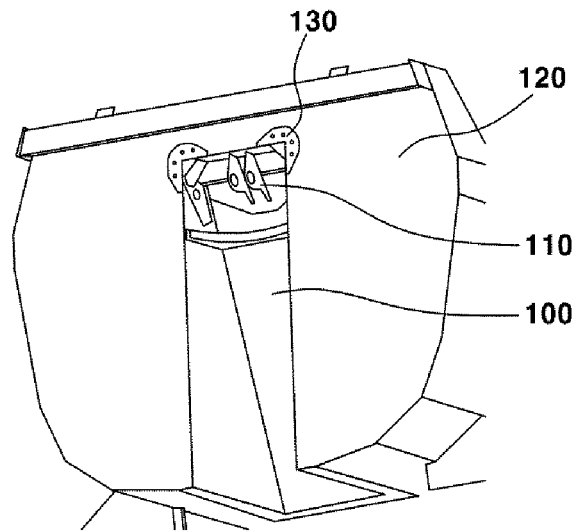
FIGS. 2 and 3 are perspective views of a pocket top reinforcement structure of a loading bay including a combination of a floor type deck and an eye end cylinder according to the related art.
Figure 3:
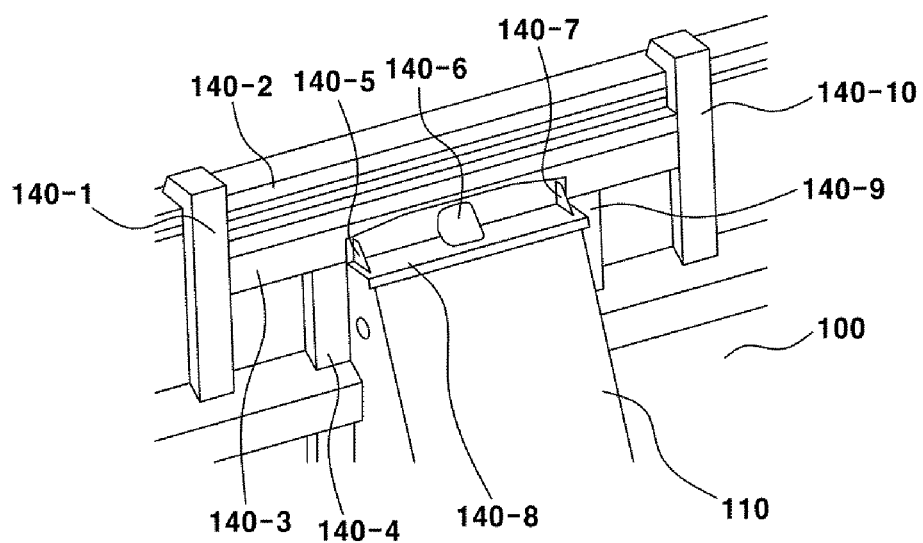
Figure 4:
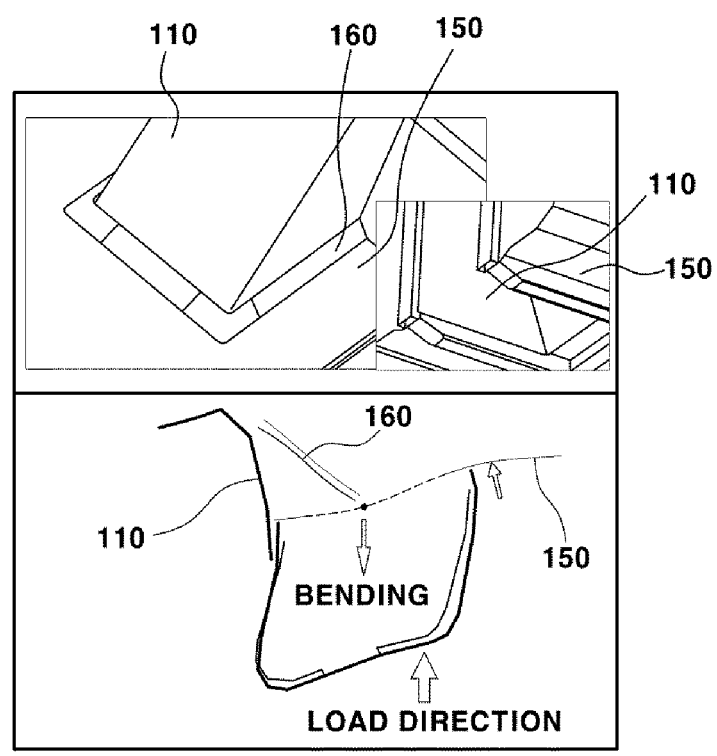
FIG. 4 is a perspective view and a cross-sectional view of a pocket bottom reinforcement structure of a loading bay including a combination of a floor type deck and an eye end cylinder according to the related art.
Figure 5A:
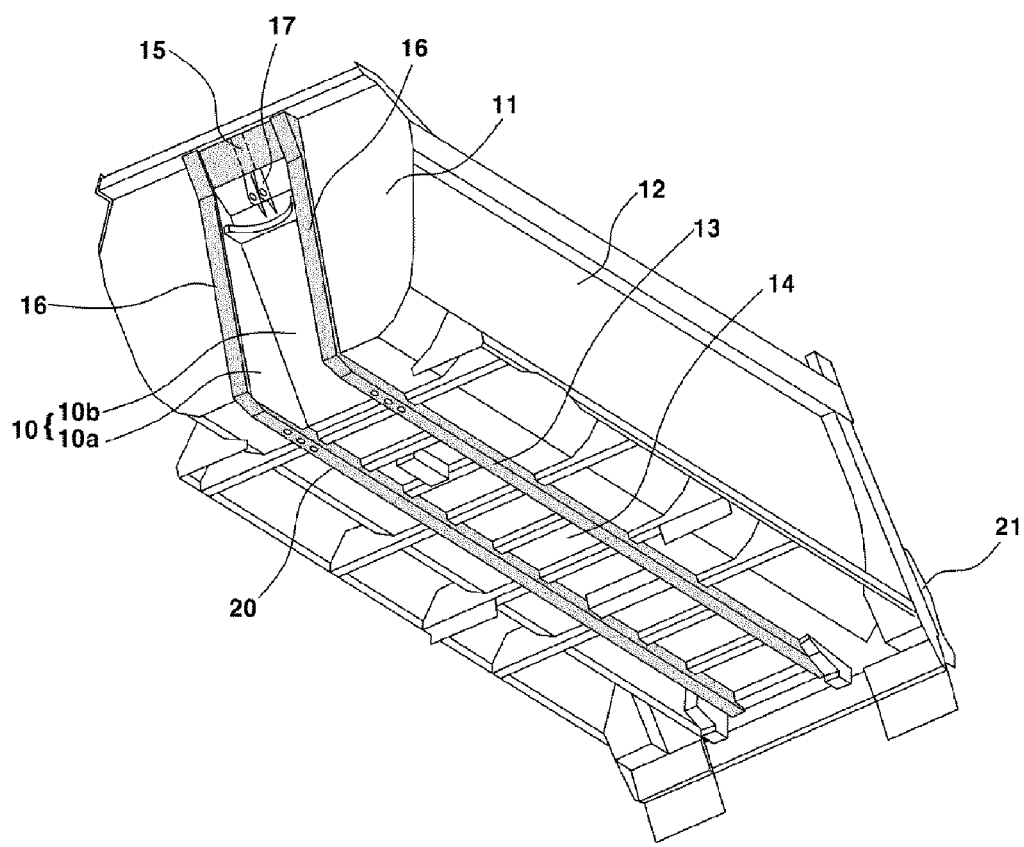
FIGS. 5A and 5B are perspective views of a frame type dump deck for a dump truck according to an embodiment of the present disclosure.
Figure 5B:
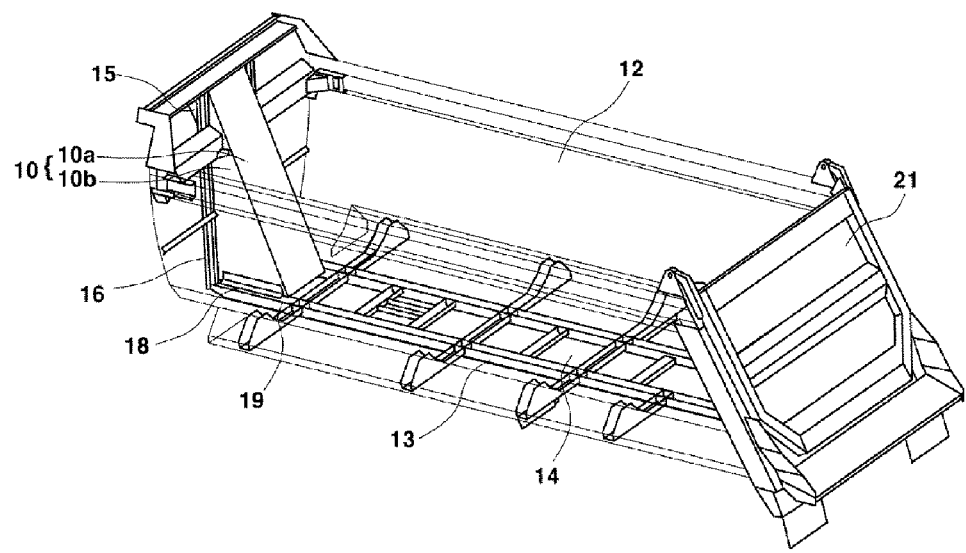
Figure 6:
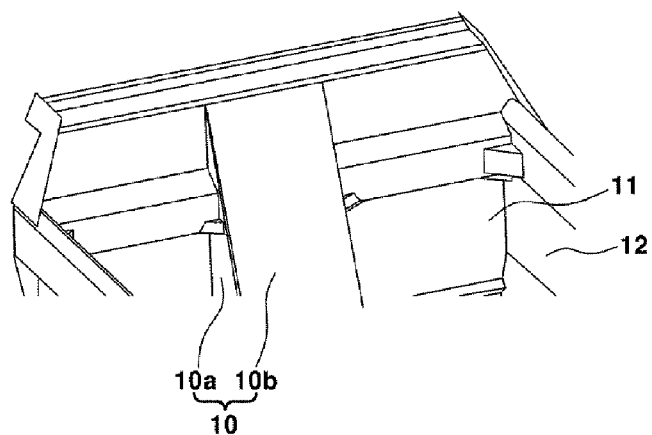
FIG. 6 is a perspective view of an inside of a pocket of the frame type dump deck for the dump truck illustrated in FIGS. 5A and 5B.
Figure 7:
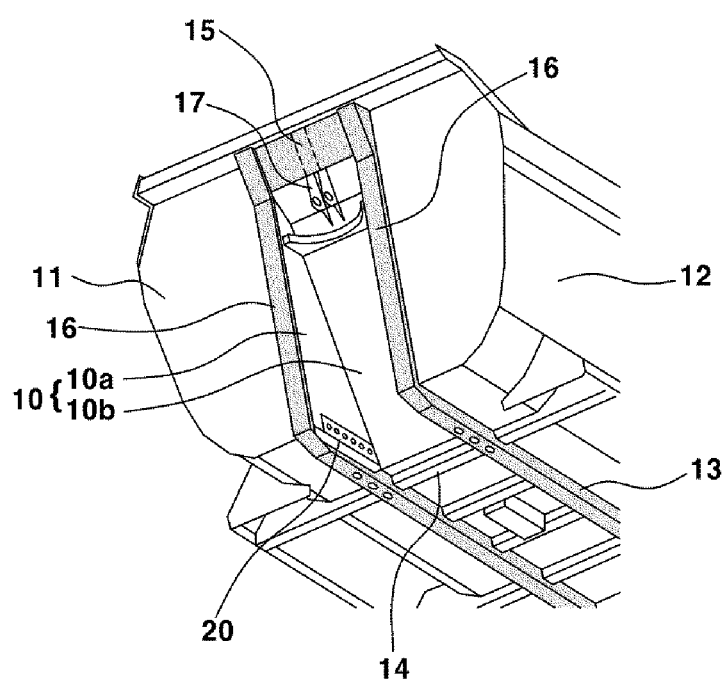
FIG. 7 is a perspective view of an outside of the pocket of the frame type dump deck for the dump truck of FIGS. 5A and 5B.

FIGS. 5A and 5B are perspective views of a frame type dump deck for a dump truck according to an embodiment of the present disclosure, FIG. 6 is a perspective view of an inside of a pocket of the frame type dump deck for the dump truck illustrated in FIGS. 5A and 5B, and FIG. 7 is a perspective view of an outside of the pocket of the frame type dump deck for the dump truck of FIGS. 5A and 5B.

As illustrated in FIGS. 5A and 5B, 6, and 7, the frame type dump deck for the dump truck according to the current embodiment of the present disclosure has a structure in which the structure of the periphery and the top and bottom of the pocket are reinforced so that stiffness may be improved and durability may be guaranteed.

To this end, the frame type dump deck for the dump truck basically includes a front panel 11, two side panels 12, a floor panel 14, and a deck door 21 that may be open or closed in a backward direction of the frame type dump deck so as to constitute a loading space.

Each of the side panels 12 are attached to opposing ends of the interior face of the front panel 11 such that the side panels 12 are opposite each other. The side panels 12 extend in the deck length direction and form the side portions of the dump deck of the dump truck.

A pocket 10 including both sidewall panels 10a and an inclination panel 10b is formed in the center portion between right and left widths of the front panel 11. The sidewall panels 10a extend perpendicularly form an interior face of the center portion of the front panel and form a structure for the pocket 10. A cylinder, such as for example, a pair of cylinder hinges 17 that may connect loads of an eye end cylinder, are mounted on an outside top face of the pocket 10.

Floor frames 13 are arranged in two parallel rows, and extend in a deck length direction while maintaining a predetermined gap in the center of the right and left widths of the pocket 10, for example, a distance corresponding to the right and left widths of the pocket 10, are formed on the floor panel 14 so that stiffness of the floor panel 14 may be guaranteed. The floor frames 13 terminate at the front panel 11.

A pocket reinforcement member 15 and two side pocket frames 16 are disposed as units for reinforcing both edges of the outside of the pocket 10 and the top of the pocket 10. The pocket frames 16 extend from the terminal ends of the floor frames 13 and extend in parallel along each edge of the pocket 10 and include top portions connected to each other by a pocket reinforcement member 15 disposed in a direction perpendicular to the direction of the pocket frames 16.

The pocket frames 16 are integrally formed on an outside face of the front panel 11 so that an eye end cylinder is connected to a cylinder hinge 17 above the pocket 10.

To this end, the pocket frames 16 may have a shape of a bar that extends in a direction perpendicular to the direction of the floor frames 13, and extend along both edges of the pocket 10. The pocket frames 16 may be formed outside the front panel 11, and top portions of the two pocket frames 16 formed in this way are connected to each other by the pocket reinforcement member 15 disposed in a direction perpendicular to the direction of the pocket frames 16 (a direction of the right and left widths of the front panel 11).

Thus, the pocket frames 16 and the pocket reinforcement member 15 that are formed in right and left sides and top of the pocket 10, form a "∩" shape.

In this case, the pocket frames 16 and the pocket reinforcement member 15 need not be welded by additional parts, but may be integrated with the front panel 11 including the pocket 10.

That is, the pocket frames 16 and the pocket reinforcement member 15 may have a deck-integrated structure, and not a patch.

In some embodiments, such as those shown in FIG. 5A or FIG. 7, the pocket reinforcement member 15 has a cross-section of a triangle that contacts the bottom surface of a flange that is bent by 90° from the top of the front panel 11.

The two side pocket frames 16 extend from terminal ends of the corresponding floor frames 13 disposed on the floor panel 14 so that each pocket frame 16 and each floor frame 13 constitute an integrated reinforcement structure in which they are connected to each other.

That is, the floor frames 13 of the frame type dump deck may extend, via the pocket frames 16, to the front panel 11.

In this way, the pocket frame 16 and the pocket reinforcement member 15 constitute a structure that surrounds the periphery of the pocket 10. Thus, stress concentration on a corner of the pocket 10 when deck torsional deformation occurs, may be alleviated. As a result, a problem relating to the durability of the pocket 10 is solved, which provides an advantage in connecting an eye end cylinder to the cylinder hinge 17 above the pocket 10.

In particular, as illustrated in FIG. 6, an inside top of the pocket 10 extends to a height that is coincident with the top of the front panel 11.

In this manner, existing inside reinforcement members are deleted, and the pocket 10 extends to the top surface of the front panel 11 so as to prevent the problem relating to the durability of the pocket 10 so that the weight of the frame type dump deck for the dump truck can be reduced. As a result of the reduction in the welding portion, the frame type dump deck for the dump truck can be easily manufactured.

Figure 8:
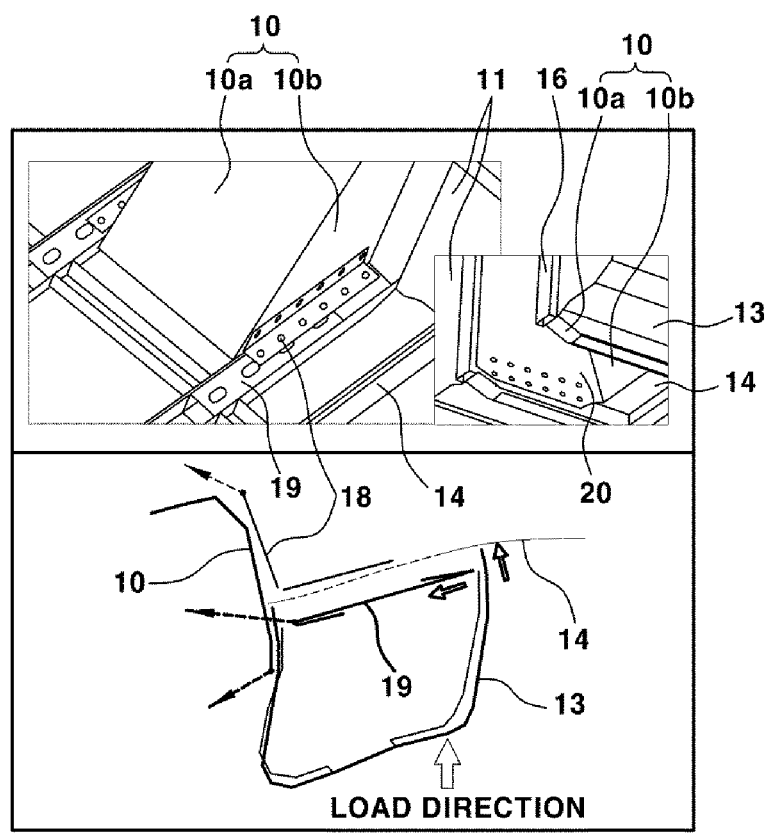
FIG. 8 is a perspective view and a cross-sectional view of a pocket bottom reinforcement structure of the frame type dump deck for the dump truck of FIGS. 5A and 5B.

FIG. 8 is a perspective view and a cross-sectional view of a pocket bottom reinforcement structure of the frame type dump deck for the dump truck of FIGS. 5A and 5B.

As illustrated in FIG. 8, an upper reinforcement member 18 and a lower reinforcement member 19 are disposed as units for reinforcing an inside bottom of the pocket 10. The upper reinforcement member 18 and the lower reinforcement member 19 in this case are stacked in a direction parallel to the direction of the pocket frames 16. The upper reinforcement member 18 and the lower reinforcement member 19 may be disposed in parallel along the bottom of both sidewall panels 10a of the pocket 10 and are welded and fixed to the pocket 10 and the floor panel 14. Thus, the pocket 10 and the floor panel 14 may be integrally connected to each other by the upper and lower reinforcement members 18 and 19.

In this case, the lower reinforcement member 19 extends to a position between the inside face of the front panel 11 and a terminal end of the sidewall panels 10a opposite the inside face of the front panel 11 in the deck length direction. For example, as shown in FIG. 8, the lower reinforcement member 19 may extend to a length that is longer than the bottom of the inclination panel 10b of the pocket 10 in a backward direction of the deck length direction.

Thus, by adding the upper reinforcement member 18 and the lower reinforcement member 19, a load directly transmitted to the floor panel 14 is dispersed into the lower reinforcement member 19 so that the load can be prevented from being concentrated on the floor panel 14.

In order to receive the load input to the lower reinforcement member 19, the length of the bottom of the pocket 10 is longer than that of a pocket according to the related art.

That is, a pocket extension portion 20 is formed on the bottom of the pocket 10, extends to sides of the floor frames 13 disposed on the floor panel 11 and is welded thereto.

Thus, cracks may be prevented from being transferred from the floor panel 14 to the end of the pocket 10.

In this way, according to the present disclosure, the top and bottom structure of the pocket 10 is improved so that an eye end cylinder can be mounted on the frame type dump deck. Thus, the eye end cylinder can be easily connected to the top of the frame type dump deck.

In addition, the pocket 10 is formed in a straight line and extends to the top of the pocket 10 and simultaneously, pocket top inside reinforcement members are unnecessary and as such, an operation of additionally welding 10 additional parts can be deleted. Thus, the frame type dump deck for the dump truck can be easily manufactured and its weight can be reduced.

In addition, the reinforcement members outside the pocket 10 constitute a structure integrated with the frame type dump deck without adding any patch so that the frame type dump deck for the dump truck can be easily manufactured and has excellent appearance.

Thus, by improving the above structure, an eye end cylinder can be mounted on the frame type dump deck.

As described above, a frame type dump deck for a dump truck according to the present disclosure has the following advantages.

Stiffness of upper and lower parts of a pocket may be reinforced by applying a combination of the frame type dump deck and an eye end cylinder so that the frame type dump deck for the dump truck can be easily manufactured, its weight can be reduced and its cost can be reduced.

Torsional stiffness may be increased so that user stability can be greatly improved.

Due to cost and weight reduction and beautiful appearance, marketability can be improved.

By using a reinforcement structure of the lower part of the pocket, a load to be transmitted to a floor can be dispersed into a reinforcement member so that bending deformation of the floor can be fundamentally prevented.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A frame type dump deck for a dump truck, comprising:
   a front panel comprising a pocket formed in a center portion between right and left widths of the front panel, the pocket including side wall panels which extend perpendicularly from an interior face of the center portion of the front panel;
   two side panels, each side panel attached to opposing ends of the interior face of the front panel and which extend in a deck length direction;
   a floor panel attached to the interior face of the front panel, the floor panel having floor frames arranged in two parallel rows which extend in the deck length direction, and terminate at the front panel, and
   pocket frames which extend from terminal ends of the floor frames and which extend in parallel along respective edges of the pocket and include top portions connected to each other by a pocket reinforcement member disposed in a direction perpendicular to a direction of the pocket frames,
   wherein the pocket frames are integrally formed on an outside face of the front panel so that an eye end cylinder is connected to a cylinder hinge above the pocket.

2. The frame type dump deck of claim 1, wherein an inside top of the pocket extends to a height that is coincident with a top of the front panel.

3. The frame type dump deck of claim 1 or 2, wherein an upper reinforcement member and a lower reinforcement member are installed at an inside bottom of the pocket, are disposed in parallel along both side wall panels of the pocket, are stacked in a direction parallel to the direction of the pocket frames, and connect the pocket and the floor panel to each other.

4. The frame type dump deck of claim 3, wherein the lower reinforcement member extends to a position between the inside face of the front panel and a terminal end of the sidewall panels opposite the inside face of the front panel in the deck length direction.

5. The frame type dump deck of claim 1, further comprising a pocket extension portion that is formed on a bottom of the pocket adjacent to the floor panel, extends to sides of the floor frames disposed on the floor panel and is welded to the floor frames.

* * * * *